United States Patent
Copty et al.

(10) Patent No.: US 10,606,732 B2
(45) Date of Patent: Mar. 31, 2020

(54) HYBRID GENETIC CONCOLIC CO-VERIFICATION OF HARDWARE AND SOFTWARE

(71) Applicant: International Business Machines Corporation, Armonk, NY (US)

(72) Inventors: Fady Copty, Nazareth (IL); Dov Murik, Haifa (IL); Sharon Keidar Barner, Megiddo (IL)

(73) Assignee: International Business Machines Corporation, Armonk, NY (US)

( * ) Notice: Subject to any disclaimer, the term of this patent is extended or adjusted under 35 U.S.C. 154(b) by 87 days.

(21) Appl. No.: 15/905,911

(22) Filed: Feb. 27, 2018

(65) Prior Publication Data

US 2019/0266071 A1    Aug. 29, 2019

(51) Int. Cl.
*G06F 9/44*     (2018.01)
*G06F 11/36*    (2006.01)

(52) U.S. Cl.
CPC ...... *G06F 11/3664* (2013.01); *G06F 11/3608* (2013.01); *G06F 11/3612* (2013.01); *G06F 11/3684* (2013.01)

(58) Field of Classification Search
CPC .. G06F 11/3608; G06F 11/3612; G06F 9/455; G06F 9/5027; G06F 11/3664; G06F 11/3684
See application file for complete search history.

(56) References Cited

U.S. PATENT DOCUMENTS 8,612,989 B1 * 12/2013 Richards .............. G06F 9/5027
                                                        718/105
8,924,937 B1    12/2014 Andrews et al.
(Continued)

FOREIGN PATENT DOCUMENTS

CN        101859274      6/2013

OTHER PUBLICATIONS

Bekrar et al., "Finding Software Vulnerabilities by Smart Fuzzing", 2011 Fourth IEEE International Conference on Software Testing, Verification and Validation, 2011, pp. 427-430.
(Continued)

*Primary Examiner* — Tuan A Vu
(74) *Attorney, Agent, or Firm* — Ziv Glazberg

(57) ABSTRACT

An apparatus, a computer program product and a method for hybrid genetic concolic co-verification of hardware and software. The method comprises repeatedly obtaining a test input for a system comprising a software and a hardware; performing a symbolic co-simulation of the system executing the test input to generate a symbolic co-simulation constraint and utilizing the symbolic co-simulation constraint to generate a new test input. The symbolic co-simulation comprises iteratively performing concolic execution of the software and symbolic simulation of the hardware. The concolic execution is guided using the test input and monitors software symbols. Iteratively performing the concolic execution and the symbolic simulation comprises collecting both software symbolic constraints over the software symbols and hardware symbolic constraints over at least a portion of the software symbols to generate the symbolic co-simulation constraint that comprises the software symbolic constraints and the hardware symbolic constraints.

15 Claims, 3 Drawing Sheets

(56) References Cited

U.S. PATENT DOCUMENTS

| | | |
|---|---|---|
| 9,323,597 B2 | 4/2016 | Eddington |
| 9,372,772 B1 | 6/2016 | Balan et al. |
| 2012/0084759 A1* | 4/2012 | Candea ............... G06F 11/3612 717/126 |
| 2014/0304685 A1* | 10/2014 | Xie ........................ G06F 9/455 717/124 |
| 2015/0339217 A1* | 11/2015 | Avgerinos ........... G06F 11/3608 717/132 |

OTHER PUBLICATIONS

Rowson, "Hardware/Software Co-Simulation", 31st Design Automation Conference, 1994, pp. 439-440.
Cadence, Palladium Hybrid. Available at: https://www.cadence.com/content/cadence-www/global/en_US/home/tools/system-design-and-verification/acceleration-and-emulation/palladium-hybrid.html.
Powell et al., "HW/SE Co-Simulation", Introduction to VLSI and ASIC Design, Winter 2000. Available at: http://www.frobnotz.com/cosim/cosim.html.

* cited by examiner

HYBRID GENETIC CONCOLIC CO-VERIFICATION OF HARDWARE AND SOFTWARE

TECHNICAL FIELD

The present disclosure relates to verification of systems in general, and to symbolic co-verification of hardware and software in combination with coverage feedback based test generating methods, in particular.

BACKGROUND

System Verification is the evaluation of whether or not a system complies with certain requirements, such as regulations, specifications, imposed conditions, properties, goals, or the like. System verification may be used as an instrumental means for proving or disproving the correctness of intended algorithms underlying the system with respect to the certain requirements.

In the development phase, verification procedures involve performing special tests to model or simulate a portion, or the entirety, of a system, then performing a review or analysis of the modeling results. In the post-development phase, verification procedures involve regularly repeating tests devised specifically to ensure that the system continues to meet the initial requirements as time progresses.

Every aspect of the system: hardware, software and communications, should be verified and thoroughly tested before the system is used. After successful testing, systems will need regular maintenance to ensure they will perform effectively when they are needed.

Software verification is the process of checking that the output of each phase of the software development process effectively carry out what its corresponding input artifact specifies.

Hardware Verification is the process of checking that a given design correctly implements the specification. It is recognized as the largest task in silicon development and as such has the biggest impact on the key business drivers of quality, schedule and cost.

BRIEF SUMMARY

One exemplary embodiment of the disclosed subject matter is a method comprising: obtaining a test input for a system, wherein the system comprises a software-under-test and a hardware-under-test; performing a symbolic co-simulation of the system executing the test input, wherein said symbolic co-simulation comprises: iteratively performing concolic execution of the software-under-test and symbolic simulation of the hardware-under-test; wherein the concolic execution is guided using the test input, wherein the concolic execution monitors software symbols; wherein said iteratively performing comprises collecting both software symbolic constraints over the software symbols and hardware symbolic constraints over at least a portion of the software symbols; whereby generating a symbolic co-simulation constraint that comprises the software symbolic constraints and the hardware symbolic constraints.

Optionally, the method further comprising: utilizing the symbolic co-simulation constraint to generate a new test input.

Optionally, the new test input is configured to invoke a different execution path of the software-under-test than the test input.

Optionally, the method comprises repeatedly: generating the test input; performing the symbolic co-simulation of the system using the test input; utilizing the symbolic co-simulation constraint to generate a new test input; whereby the new test input is used as the test input for a successive symbolic co-simulation of the system.

Optionally, said iteratively performing concolic execution of the software-under-test and symbolic simulation of the hardware-under-test comprises: performing the concolic execution until invoking a hardware interface; identifying a portion of the software symbols that is passed through the hardware interface; setting symbols in the symbolic simulation of the hardware-under-test to be connected to the portion of the software symbols.

Optionally, said iteratively performing the concolic execution of the software-under-test and the symbolic simulation of the hardware-under-test comprises: performing symbolic simulation of a single cycle of the hardware-under-test; and in response to conclusion of the symbolic simulation of the single cycle, utilizing results of the symbolic simulation of the single cycle in performing said concolic execution of the software-under-test.

Optionally, the method further comprises: in response to performing an iteration of said iteratively performing the concolic execution of the software-under-test and the symbolic simulation of the hardware-under-test, utilizing the symbolic co-simulation constraint to perform fuzzing of the test input, whereby obtaining a new test input, wherein the new test input is utilized in another iteration of said iteratively performing the concolic execution of the software-under-test and the symbolic simulation of the hardware-under-test.

Another exemplary embodiment of the disclosed subject matter is a computer program product comprising a non-transitory computer readable storage medium retaining program instructions, which program instructions when read by a processor, cause the processor to perform a method comprising: obtaining a test input for a system, wherein the system comprises a software-under-test and a hardware-under-test; performing a symbolic co-simulation of the system executing the test input, wherein said symbolic co-simulation comprises: iteratively performing concolic execution of the software-under-test and symbolic simulation of the hardware-under-test; wherein the concolic execution is guided using the test input, wherein the concolic execution monitors software symbols; wherein said iteratively performing comprises collecting both software symbolic constraints over the software symbols and hardware symbolic constraints over at least a portion of the software symbols; whereby generating a symbolic co-simulation constraint that comprises the software symbolic constraints and the hardware symbolic constraints.

Yet another exemplary embodiment of the disclosed subject matter is an apparatus comprising said processor and a memory, wherein said memory retaining the computer program product.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
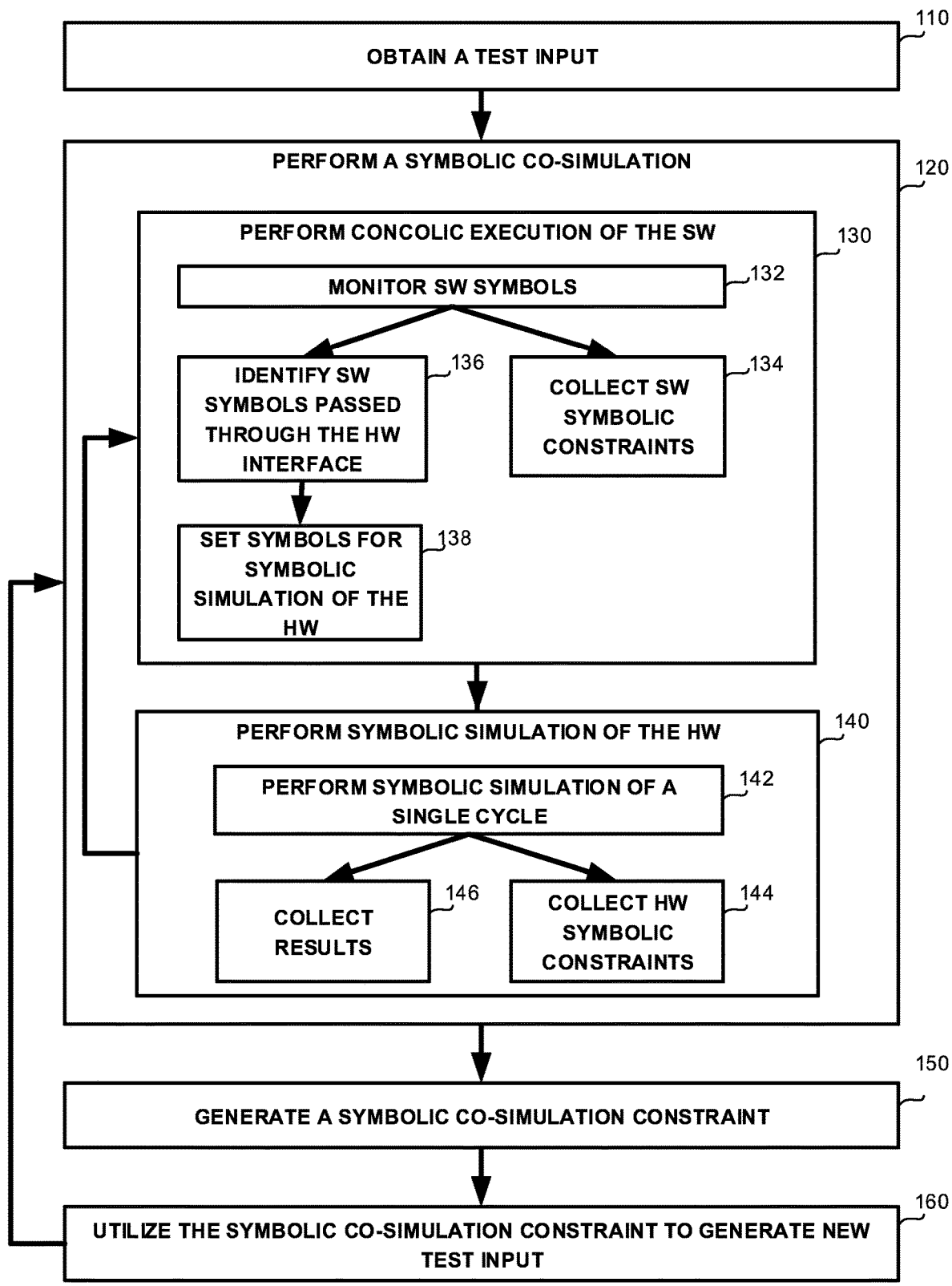
FIG. 1 shows a flowchart diagram of a method, in accordance with some exemplary embodiments of the disclosed subject matter.

One technical problem dealt with by the disclosed subject matter is to perform a verification of the hardware and the software of a computer system together early in the design process.

In some exemplary embodiments, when verifying a system that comprises a hardware and a software component, the hardware and software may be verified separately and then tested together. Software verification may be performed by executing the software and observing its behavior while treating the hardware as a black box, using static analysis without executing the software, or the like. In some cases, the software verification may be performed before the hardware is built. Hardware verification may involve making sure that the hardware performs correctly in response to outside stimuli and executing the software. After performing the software verification and the hardware verification separately, the system may be tested to verify that executing the software and the hardware meets the requirements. However, such testing may be prone to low coverage and human error. Even when trying to perform a verification using co-simulation of both of the hardware and the software, engineers may be able to control inputs of the software only. As a result, a high hardware coverage may be hard to achieve, and hardware verification engineers and designers may be required to spend a lot of time debugging and fixing problems that may not occur when the hardware and software are executed together.

One technical solution is to utilize a hybrid genetic concolic co-verification of hardware and software. In some exemplary embodiments, symbolic co-simulation constraints generated by symbolic or concolic co-verification of hardware and software, may be utilized to generate test inputs that sufficiently cover both the hardware and the software coverage requirements, and invoke unique coverage events of the system. The test inputs may be generated using genetic fuzzing based generation method, or any other generation method that is performed based on symbolic co-simulation constraints.

In some exemplary embodiments, a symbolic co-simulation of the system executing a test input may be performed. In symbolic co-simulation, different possible executions of the system may be considered simultaneously. In some exemplary embodiments, software symbols may be used in the simulation state representation in order to index multiple executions of the system. Each software symbol may represent a symbolic variable that different alternative values can be assigned thereto. For each possible valuation of these variables, there is a concrete system state that is being indirectly simulated.

In some exemplary embodiments, symbolic co-simulation of the system may comprise repeatedly performing concolic execution of the software of the system (e.g., the software-under-test) and symbolic simulation of the hardware of the system (e.g., the hardware-under-test).

In some exemplary embodiments, the concolic execution of the software-under-test may be a software verification technique that performs symbolic execution of the software-under-test, that treats program variables as symbolic variables, along a concrete execution path of the test input. In some exemplary embodiments, the concolic execution may be guided using the test input. The concolic execution may be configured to monitor software symbols. Initial values may be assigned to the software symbols based on the test input. In a concrete execution, the execution of the software-under-test may be performed based on the values of the software symbols as provided by the test input, and execute an execution path based on such values. The concolic execution of the software-under-test may follow the same path but may treat the software symbols as symbolic variables. During the concolic execution software symbolic constraints of the software symbols may be collected based on the execution path. Each software symbolic constraint on the software symbols may define a path condition and must be true for all executions following the same execution path as the current one.

In some exemplary embodiments, the concolic execution of the software-under-test may be performed until invoking a hardware interface. When a hardware interface is invoked, a portion of the software symbols that is passed through the hardware interface may be identified.

In some exemplary embodiments, the symbolic simulation of the hardware-under-test may be guided by the portion of the software symbols that is passed through the hardware interface. Symbols in the symbolic simulation of the hardware-under-test may be set to be connected to the portion of the software symbols. Each symbol in the symbolic simulation of the hardware-under-test after being assigned in accordance with the respective software symbol, may be used in the simulation state representation in order to index multiple executions of the hardware-under-test. For each possible valuation of these symbols, there may be a concrete system state that is being indirectly simulated.

In some exemplary embodiments, during the symbolic simulation of the hardware-under-test, hardware symbolic constraints over at least a portion of the software symbols may be collected. Each hardware symbolic constraint may represent a concrete system state that is being indirectly simulated based on the relevant software symbols.

In some exemplary embodiments, a symbolic co-simulation constraint that comprises the software symbolic constraints and the hardware symbolic constraints may be generated.

In some exemplary embodiments, the symbolic co-simulation may be used in conjunction with an automated theorem prover or constraint solver based on constraint logic programming to generate new test inputs with the aim of maximizing code coverage. The new test inputs may be configured to invoke different execution paths of the software-under-test than the test input. An automated theorem prover may be invoked to find values for the software symbols in accordance with the symbolic co-simulation constraint.

In some exemplary embodiments, new test inputs may be repeatedly generated based on the symbolic co-simulation constraint. The symbolic co-simulation of the system may be performed using the test input generated in the previous iteration to determine a new symbolic co-simulation constraint. The new symbolic co-simulation constraint may be then utilized to generate a new test input.

One technical effect of utilizing the disclosed subject matter is to provide for an enhanced co-verification of software-hardware systems, while obtaining a wider coverage model. By performing the symbolic co-simulation, new tests invoking interesting aspects of the system may be found. The symbolic co-simulation may be combined with other test generation methods, to create new tests inputs that can direct the symbolic co-simulation to new components.

Another technical effect of utilizing the disclosed subject matter is to enable hardware developers to focus their verification efforts only on hardware issues relevant to the specific software coupled with the hardware. This will eliminate false positive results of bugs in the system and unnecessary debug and fix time, reducing the product's time to market.

As yet another technical effect of utilizing the disclosed subject matter is to utilize the symbolic co-simulation along with genetic test input generating methods to generate effective test inputs for systems. The test input generating methods may be methods that rely on coverage feedback of the executed run, such as genetic fuzzing. Symbolic co-simulation may be configured to find new paths in the system that the genetic fuzzing cannot, but it may be a slow technique for generating test inputs. On the other hand, genetic fuzzing may be a fast technique for generating test inputs but it may tend to get stuck in local minima. Utilizing a hybrid genetic-concolic co-verification of hardware and software may result in generating effective test inputs, in substantially short time, without tending to local minima.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1 showing a flowchart diagram of a method, in accordance with some exemplary embodiments of the disclosed subject matter.

On Step 110, a test input may be obtained. In some exemplary embodiments, the test input may be designed to test a software-hardware system. The software-hardware system may comprise a software-under-test and a hardware-under-test that is capable of executing the software-under-test. In some exemplary embodiments, the test input may be generated based on an initial coverage model of the software-hardware system. The test input may be designed to satisfy coverage goals of the initial coverage model. In some exemplary embodiments, the test input may be generated by a test generator. The test generator may be configured to utilize a test generation method that generates test inputs based on coverage models, such as automatic model-based test generation, symbolic model checking, or the like. As an example, the test generator may be a fuzz testing based.

On Step 120, a symbolic co-simulation of the software-hardware system executing the test input may be performed. In some exemplary embodiments, the symbolic co-simulation may be utilized to analyze the software-hardware system, in order to determine what inputs invoke each part of the software-hardware system. The symbolic co-simulation may be configured to simulate execution of the test input by the software-hardware system, while using symbolic input values in accordance with the test input, instead of concrete data.

In some exemplary embodiments, the symbolic co-simulation may comprise iteratively performing concolic execution of the software-under-test (Step 130) and symbolic execution of the hardware-under-test (Step 140).

On Step 130, a concolic execution of the software-ender-test may be performed.

In some exemplary embodiments, the concolic execution may be guided using the test input. The concolic execution may be configured to perform symbolic execution of the software-under-test, along a concrete execution path.

On Step 132, software symbols may be monitored. In some exemplary embodiments, in the concolic execution, a particular set of variables may be classified as input variables. The input variables may be treated as symbolic variables, e.g., symbols, while all the other variables may be treated as concrete values. The concrete execution path may be determined based on constraints on the software symbols and values of the other variables with respect to the test input.

In some exemplary embodiments, the concolic execution may be configured to monitor the software symbols in order to determine paths and relevant constraints associated therewith.

On Step 134, software symbolic constraints may be collected over the software symbols. In some exemplary embodiments, the software-under-test may be instrumented so that each operation which may affect a software symbol value or a path condition is logged to a trace file, as well as any error that occurs. During the concolic execution of the software-under-test, symbolic constraints are determined and collected based on the execution path. In some exemplary embodiments, the symbolic constraints may be expressions of the software symbols, limitations on values of the software symbols, path conditions, or the like.

In some exemplary embodiments, During the concolic execution of the software-under-test, path conditions that have not been already negated may be negated in order to visit a new execution path. If there is no such path condition, the algorithm may terminate.

On Step 136, a portion of the software symbols that are passed through a hardware interface during the concolic execution may be identified. In some exemplary embodiments, the concolic execution of the software-under-test may be performed until invoking a hardware interface. When invoking the hardware interface, a portion of the software symbols that is passed through the hardware interface may be identified.

On Step 138, symbols that may be passed to Step 140, to be used in the symbolic simulation of the hardware-under-test, may be set to be connected to the portion of the software symbols.

As an example, given an Let us take an Instructions Set Architecture (ISA) command, that loads a value to a register, such as load R1, R2 which may be configured to load the value of R2 into register R1; R2 may be chosen to be a symbol. As a result, all signals that hold the value of R2 in the hardware may be marked as symbols.

On Step 140, a symbolic simulation of the hardware-under-test may be performed. In some exemplary embodiments, the symbolic simulation may simulate the execution of the hardware-under-test, while considering multiple possible executions of portions of the hardware-under-test simultaneously. In some exemplary embodiments, symbolic variables may be used in the simulation state representation in order to index multiple executions of the hardware-under-test. For each possible valuation of these symbolic variables, there may a concrete system state that is being indirectly simulated. The symbolic variables may be determined in accordance with symbols passed by the software-hardware-interface when performing the concolic execution of the software-under-test (Step 138).

On Step 142, a symbolic simulation of a single cycle of the hardware-under-test may be performed. A single cycle of the hardware-under-test may be defined as a hardware clock cycle, when a clock moves from 0 to 1 and moves back to 0 (or from 1 to 0 to 1). Additionally or alternatively, a single cycle of the hardware-under-test may be defined as a new clock that runs according to a logic related to the hardware clock cycle, as an example, the hardware clock cycle may consist of 2 hardware clock cycles, 3 hardware clock cycle, or the like.

On Step 146, results of the symbolic simulation of the single cycle may be provided to be utilized in performing the next iteration of the concolic execution of the software-under-test. (repeating Step 130)

On Step 144, hardware symbolic constraints may be collected over the portion of the software symbols are used in the hardware simulation. Additionally or alternatively, hardware symbolic constraints may be collected over hardware symbols with respect to the software symbols.

As an example, the output of the hardware-under-test may be a Boolean function $f$ of a, b, and c. Parameters a, and b of the function may be determined to be symbols, while c may be a assigned, during the symbolic simulation, a concrete value that equals to k. The constraint $f(a,b,c=k)$ is may be added to the hardware symbolic constraints for the software path.

On Step 150, a symbolic co-simulation constraint may be generated. In some exemplary embodiments, the symbolic co-simulation constraint may comprise the software symbolic constraints collected in the different iterations of Step 134, and the hardware symbolic constraints collected in the different iterations of Step 144. The symbolic co-simulation constraint may be configured to be satisfied only if all of the generated constraints are satisfied. As an example, the symbolic co-simulation constraint may be a multiplication of a binary representation of all of the generated constraints.

On Step 160, the symbolic co-simulation constraint may be utilized to generate a new test input. In some exemplary embodiments, the new test input may configured to invoke a different execution path of the software-under-test than the test input.

In some exemplary embodiments, an automated theorem prover may be invoked to generate the new input. The automated theorem prover may be configured to solve symbolic co-simulation constraint to determine values for the software symbols in the new test input.

In some exemplary embodiments, Step 120 may be repeated using the new test input.

Figure 2:
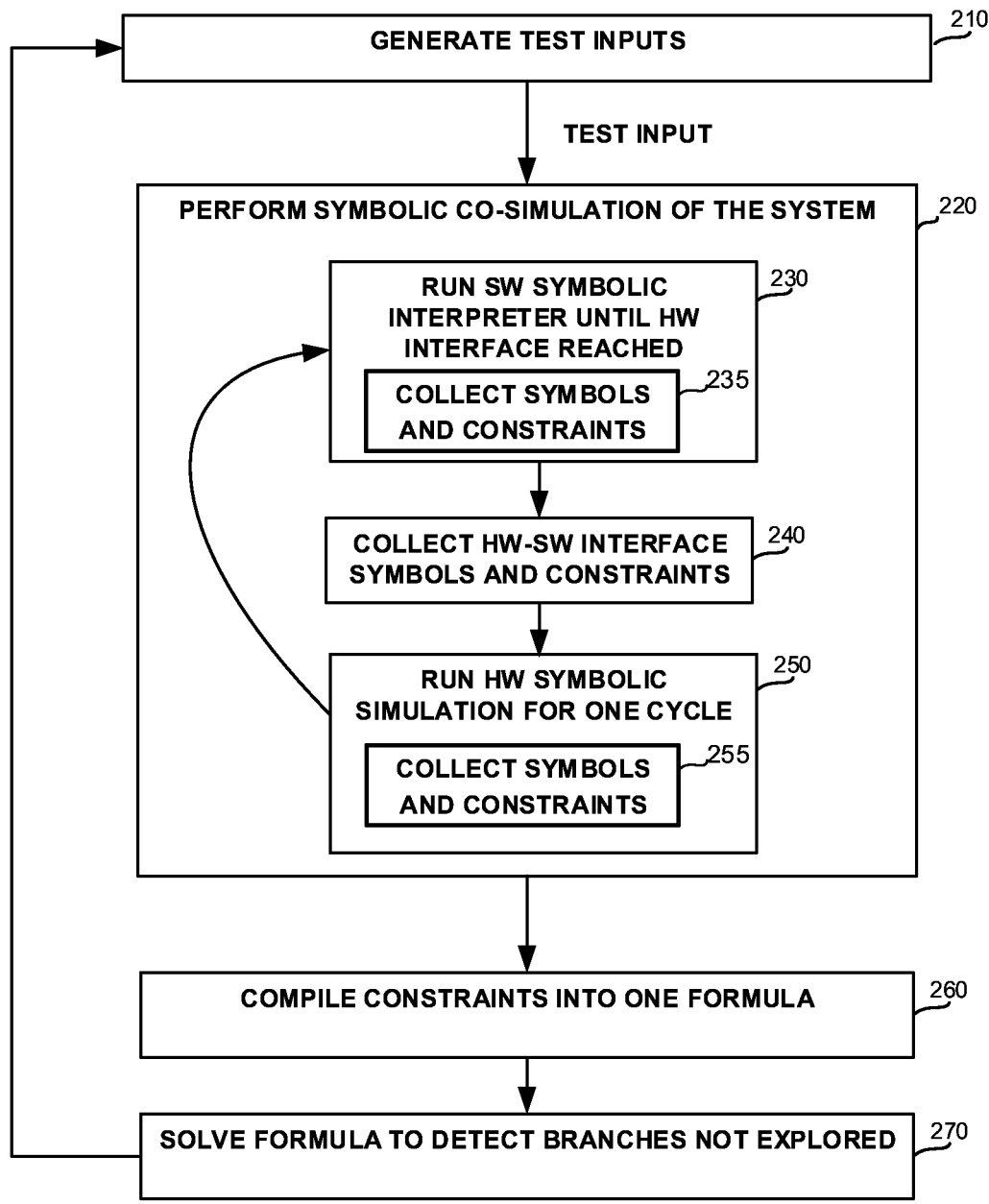
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

On Step 210, a test input may be generated. In some exemplary embodiments, the test input may be designed to test a system. The system may comprise a software-under-test and a hardware-under-test that is capable of executing the software-under-test. In some exemplary embodiments, the test input may be generated based on an initial coverage model of the system. The test input may be designed to satisfy coverage goals of the initial coverage model. The test input may be configured to invoke a unique path of the system.

In some exemplary embodiments, the test input may be generated by a test generator. The test generator may be configured to utilize a test generation method that generates test inputs based on coverage models, such as automatic model-based test generation, symbolic model checking, or the like. Additionally or alternatively, the test input may be generated by employing heuristic approaches to input generation to improve the coverage of the coverage goals. In some exemplary embodiments, generated inputs may be measured against the combined coverage model and used to update the heuristic.

In some exemplary embodiments, the test input may be generated using fuzz testing. Fuzz testing may be a software testing technique that involves testing the software-under-test by providing invalid, unexpected, or random data as input. In some exemplary embodiments, the test generator may be configured to generate the test input by fuzzing a sample input. The sample input may be an input associated with the software-under-test that may be a basis for generating the test input, such as an initial test input of the software-under-test. Additionally or alternatively, any type of input that may provide information about the structure of the test input may be utilized by the test generator for the fuzz testing, such as file formats, network protocols, environment variables, sequences of Application Program Interface (API) calls, particular interleaving of threads, or the like. In some exemplary embodiments, the test input may be generated using genetic fuzz testing. Genetic fuzz testing may employ genetic algorithms in order to efficiently increase code coverage of the test cases.

On Step 220, symbolic co-simulation of the system may be performed. In some exemplary embodiments, the symbolic co-simulation of the system may comprise repeatedly running a software symbolic interpreter until a hardware interface is reached (Step 230), collecting hardware-software interface symbols and constraints (Step 240) and running a hardware symbolic simulator for one cycle (Step 250), until an execution of the system is fully co-simulated.

On Step 230, software symbolic interpreter may be executed until reaching a hardware interface.

In some exemplary embodiments, the software symbolic interpreter may be configured to follow the software, assuming symbolic values for some of the variables in the software in accordance with the test input. Such variables may be considered as software symbols.

On Step 235, software symbols and constraints may be collected. In some exemplary embodiments, the software symbolic interpreter may arrive at expressions in terms of the software symbols for expressions and variables in the program. The software symbolic interpreter may determine constraints in terms of those software symbols for the possible outcomes of each conditional branch. The constraints may be set based on path conditions, such as logical formulas over the software symbols, accumulations of constraints that the software symbols have to satisfy for a particular path to be executed, or the like.

As a part of the design of symbolic co-simulation of the system may be to select a symbolic representation precise enough to represent the constraints of interest. Such a selection may be based on the test input invoking unique paths and the symbols being related to this path.

On Step 240, hardware-software interface symbols and constraints may be collected. In some exemplary embodiments, when the hardware interface is reached, software symbols that are configured to be passed as inputs to the hardware may be determined as hardware-software interface symbols. Hardware-software interface symbols and constraints over such symbols may be collected and provided to the hardware symbolic simulator.

As an example, an API function foo(Boolean a) that may be called from the software function foo(b), while b is a software symbol and a is a software-hardware interface symbol, a constraint asserting that a=b may be determined.

On Step 250, hardware symbolic simulation may be run for one cycle. In some exemplary embodiments, stimuli provided during symbolic co-simulation of the system from the software to underlying hardware may be transmitted to a hardware symbolic simulator. The hardware symbolic simulator may be a software package that is configured to compile and symbolically simulate hardware expressions written in one of the hardware description languages.

In some exemplary embodiments, the hardware symbolic simulation may model the complete state of the hardware executing the software. Different possible executions of the system may be considered simultaneously, by augmenting the domain over which the simulation takes place. Hardware symbols may be used in the simulation state representation, in accordance with the hardware-software interface symbols in order to index multiple executions of the system. For each possible valuation of these Hardware symbols, there may be a concrete system state that is being indirectly simulated.

On Step 255, hardware symbols and constraints may be collected. In some exemplary embodiments, the hardware symbols may be determined in accordance with the software-hardware symbols. The hardware symbolic simulator may arrive at expressions in terms of the hardware symbols for expressions and variables in the program. The hardware symbolic simulator may set hardware constraints in terms of those hardware symbols for the possible simulated states.

Steps 230-250 may be repeated until the end of a run of the symbolic co-simulation of the system.

On Step 260, all collected constraints may be compiled into one formula. In some exemplary embodiments, the collected constraints may comprise software constraints collected in Step 235, software-hardware constraints collected in Step 240 and hardware constraints collected in Step 255. As an example, the formula may be generated by concatenating the constraints with AND operations.

On Step 270, the formula may be solved to detect branches not explored. In some exemplary embodiments, an automated theorem prover or constraint solver may be utilized to solve the formula, such as Satisfiability (SAT) solver, Constraint Satisfaction Problem (CSP) solver, or the like.

Solutions found on Step 270 may be utilized in a successive iteration of Step 210, for generating a new test input.

Figure 3:
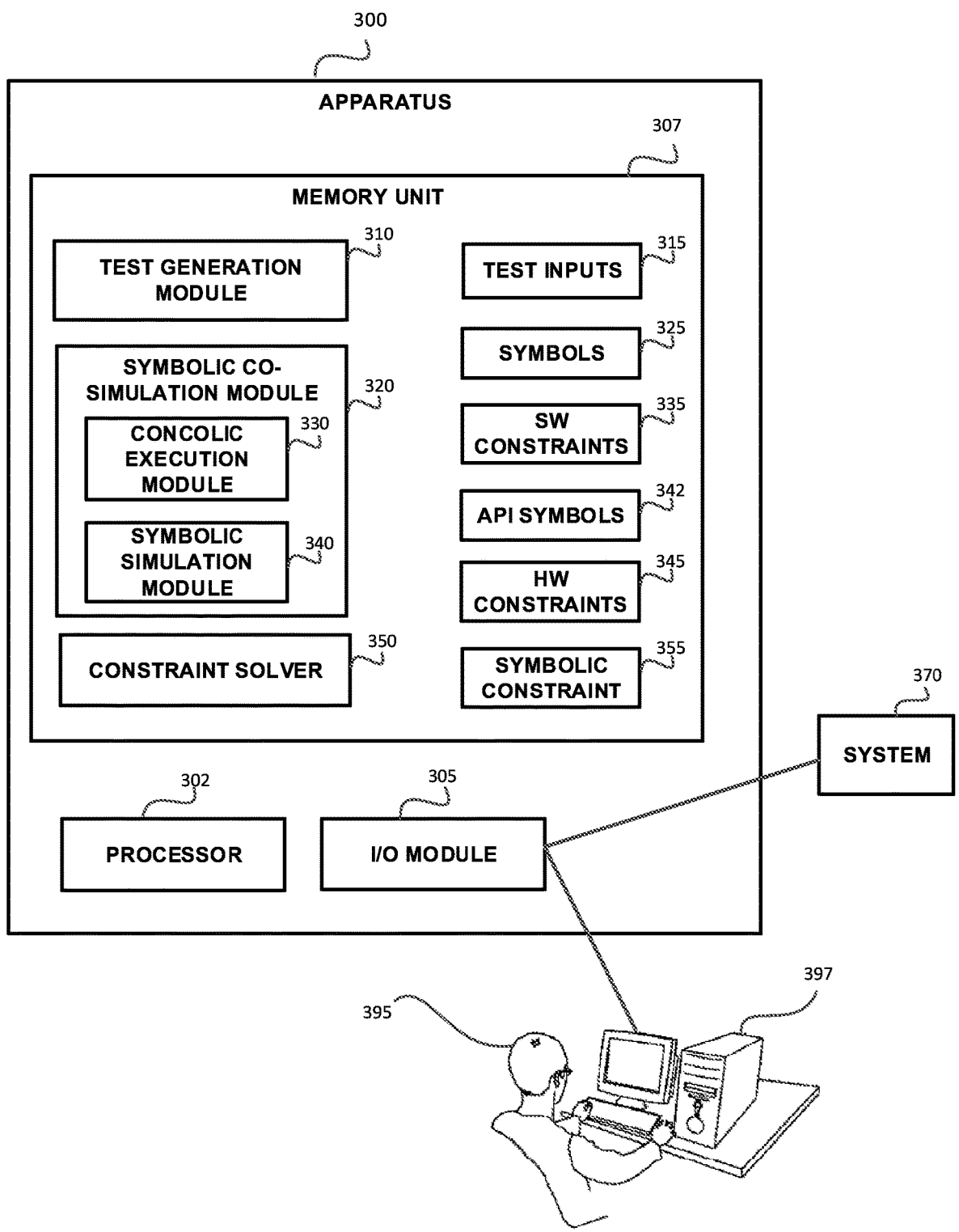
FIG. 3 shows a block diagram of an apparatus, in accordance with some exemplary embodiments of the disclosed subject matter.

Referring now to FIG. 3 showing a block diagram of an apparatus, in accordance with some exemplary embodiments of the disclosed subject matter.

An Apparatus 300 may be configured to perform a co-verification of a computer system, such as System 370, in accordance with the disclosed subject matter.

In some exemplary embodiments, Apparatus 300 may comprise one or more Processor(s) 302. Processor 302 may be a Central Processing Unit (CPU), a microprocessor, an electronic circuit, an Integrated Circuit (IC) or the like. Processor 302 may be utilized to perform computations required by Apparatus 300 or any of it subcomponents.

In some exemplary embodiments of the disclosed subject matter, Apparatus 300 may comprise an Input/Output (I/O) module 305. I/O Module 405 may be utilized to provide an output to and receive input from a User 395, such as, for example I/O Module 305 may be utilized to obtain coverage goals of the system, initial test inputs of the system, or the like. As other examples, I/O Module 305 may be utilized to obtain the software and the hardware code of the system, provide test inputs and coverage data of the system, or the like.

In some exemplary embodiments, I/O Module 305 may be used to obtain a test input of a System 370 being verified or other input data for Test Generation Module 310. User 395 may provide the input data, or the like, such as via Workstation 397. It will be appreciated that Apparatus 300 can operate automatically without human intervention.

In some exemplary embodiments, Apparatus 300 may comprise a Memory 307. Memory 307 may be a hard disk drive, a Flash disk, a Random Access Memory (RAM), a memory chip, or the like. In some exemplary embodiments, Memory 307 may retain program code operative to cause Processor 302 to perform acts associated with any of the subcomponents of Apparatus 300.

A Test Generation Module 310 may be configured to generate on ore more test input for a system, such as a test input for System 370. In some exemplary embodiments, the system (e.g., System 370) may comprise a software-under-test and a hardware-under-test. Test Inputs 315 generated by Test Generation Module 310 may be retained in Memory 307.

In some exemplary embodiments, Test Generation Module 310 may be configured to utilize a test generation method that generates test inputs based on coverage model of the system, such as automatic model-based test generation, symbolic model checking, or the like. Additionally or alternatively, Test Generation Module 310 may be configured to generate test inputs based on templates or a sample input, such as using fuzz testing. Test Generation Module 310 may be may be configured to generate the test input by fuzzing a sample input. The sample input may be an input associated with the software of the system that may be a basis for generating the test input. As an example, Test Generation Module 310 may be configured to generate test inputs using an instrumented fuzzer that employs a compile-time instrumentation and genetic algorithms to automatically generate interesting test inputs that trigger new internal states in the software.

A Symbolic Co-Simulation Module 320 may be configured to perform symbolic co-simulation of the system executing the test input. In some exemplary embodiments, Symbolic Co-Simulation Module 320 may be configured to iteratively performing concolic execution of the software of the system by a Concolic Execution Module 330 and symbolic simulation of the hardware of the system by a Symbolic Simulation Module 340.

In some exemplary embodiments, Concolic Execution Module 330 may be configured to perform concolic execution of the software of the system being verified. Concolic Execution Module 330 may be guided using a test input of the system. In some exemplary embodiments, Concolic Execution Module 330 may be configured to monitor Software Symbols 325.

In some exemplary embodiments, Concolic Execution Module 330 may be configured to collect Software Symbolic Constraints 335 over Software Symbols 325.

In some exemplary embodiments, Concolic Execution Module 330 may be configured performed the concolic execution until invoking a hardware interface. When invoking a hardware interface, Concolic Execution Module 330 may be configured to identify a portion of software Symbols 325 that is passed through the hardware interface. Symbolic Co-Simulation Module 320 may be configured to set API Symbols 342 to be connected to the portion of Software Symbols 325 that is passed through the hardware interface, and provide it to Symbolic Simulation Module 340.

In some exemplary embodiments, Symbolic Simulation Module 340 may be configured to perform a symbolic simulation of the hardware of the system being verified. In some exemplary embodiments, Symbolic Simulation Module 340 may be configured to perform symbolic simulation of a single cycle of the hardware of the system being verified. After each cycle, Concolic Execution Module 330 may be configured to utilize the results of the symbolic simulation of the cycle in performing the concolic execution of the software. In some exemplary embodiments, Software Symbols 325 may be updated after that cycle.

In some exemplary embodiments, Symbolic Simulation Module 340 may be configured collect Hardware Symbolic Constraints 345 over API Symbols 342.

In some exemplary embodiments, Symbolic Co-Simulation Module 320 may be configured to generate a Symbolic Co-Simulation Constraint 355 based on Software Symbolic Constraints 335 and Hardware Symbolic Constraints 345.

A Constraint Solver 350 may be configured to solve Symbolic Co-Simulation Constraint 355. Constraint Solver 350 may be a theorem solver, a SAT solver, a CSP solver, or the like.

Test Generation Module may be configured to utilize the output of Constraint Solver 350 to generate a new test input. The new test input may be configured to invoke a different execution path of the software of the system being verified than the test input utilized in the current iteration by Symbolic Co-Simulation Module 320.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   obtaining a test input designed to test a system, wherein the system comprises a software-under-test and a hardware-under-test, wherein the test is designed to test the software-under-test and the hardware-under-test;
   performing a symbolic co-simulation of the system executing the test input, wherein said symbolic co-simulation comprises:
      iteratively performing concolic execution of the software-under-test and symbolic simulation of the hardware-under-test;
      wherein the concolic execution is guided using the test input, wherein the concolic execution monitors software symbols;
      wherein said iteratively performing comprises:
         performing a first concolic execution of the software-under-test;
         performing a first symbolic simulation of the hardware-under-test;
         performing a second concolic execution of the software-under-test, wherein the second concolic execution of the software-under-test is based on results of the first symbolic simulation of the hardware-under-test;
         performing a second symbolic simulation of the hardware-under-test, wherein the second symbolic simulation of the hardware-under-test is based on results of the first concolic execution of the software-under-test;
      wherein said iteratively performing comprises collecting both software symbolic constraints over the software symbols and hardware symbolic constraints over at least a portion of the software symbols;
      whereby generating a symbolic co-simulation constraint that comprises the software symbolic constraints and the hardware symbolic constraints.

2. The method of claim 1 further comprising: utilizing the symbolic co-simulation constraint to generate a new test input.

3. The method of claim 2, wherein the new test input is configured to invoke a different execution path of the software-under-test than the test input.

4. The method of claim 1, wherein the method comprises repeatedly:
   generating the test input;
   performing the symbolic co-simulation of the system using the test input;
   utilizing the symbolic co-simulation constraint to generate a new test input;
   whereby the new test input is used as the test input for a successive symbolic co-simulation of the system.

5. The method of claim 1, wherein said iteratively performing concolic execution of the software-under-test and symbolic simulation of the hardware-under-test comprises:
   performing the concolic execution until invoking a hardware interface;
   identifying a portion of the software symbols that is passed through the hardware interface;
   setting symbols in the symbolic simulation of the hardware-under-test to be connected to the portion of the software symbols.

6. The method of claim 1, wherein said iteratively performing the concolic execution of the software-under-test and the symbolic simulation of the hardware-under-test comprises:
   performing symbolic simulation of a single clock cycle of the hardware-under-test; and
   in response to conclusion of the symbolic simulation of the single clock cycle, utilizing results of the symbolic simulation of the single clock cycle in performing said concolic execution of the software-under-test.

7. The method of claim 1, further comprises:
   in response to performing an iteration of said iteratively performing the concolic execution of the software-under-test and the symbolic simulation of the hardware-under-test, utilizing the symbolic co-simulation constraint to perform fuzzing of the test input, whereby obtaining a new test input,
   wherein the new test input is utilized in another iteration of said iteratively performing the concolic execution of the software-under-test and the symbolic simulation of the hardware-under-test.

8. A computer program product comprising a non-transitory computer readable storage medium retaining program instructions, which program instructions when read by a processor, cause the processor to perform a method comprising:

obtaining a test input designed to test a system, wherein the system comprises a software-under-test and a hardware-under-test, wherein the test is designed to test the software-under-test and the hardware-under-test;

performing a symbolic co-simulation of the system executing the test input, wherein said symbolic co-simulation comprises:

iteratively performing concolic execution of the software-under-test and symbolic simulation of the hardware-under-test;

wherein the concolic execution is guided using the test input, wherein the concolic execution monitors software symbols;

wherein said iteratively performing comprises:

performing a first concolic execution of the software-under-test;

performing a first symbolic simulation of die hardware-under-test;

performing a second concolic execution of the software-under-test, wherein the second concolic execution of the software-under-test is based on results of the first symbolic simulation of the hardware-under-test;

performing a second symbolic simulation of the hardware-under-test, wherein die second symbolic simulation of the hardware-under-test is based on results of the first concolic execution of the software-under-test;

wherein said iteratively performing comprises collecting both software symbolic constraints over the software symbols and hardware symbolic constraints over at least a portion of the software symbols;

whereby generating a symbolic co-simulation constraint that comprises the software symbolic constraints and the hardware symbolic constraints.

9. The computer program product of claim 8, wherein said method further comprises:

utilizing the symbolic co-simulation constraint to generate a new test input.

10. The computer program product of claim 9, wherein the new test input is configured to invoke a different execution path of the software-under-test than the test input.

11. The computer program product of claim 8, wherein said method comprises repeatedly:

generating the test input;

performing the symbolic co-simulation of the system using the test input;

utilizing the symbolic co-simulation constraint to generate a new test input;

whereby the new test input is used as the test input for a successive symbolic co-simulation of the system.

12. The computer program product of claim 8, wherein said iteratively performing concolic execution of the software-under-test and symbolic simulation of the hardware-under-test comprises:

performing the concolic execution until invoking a hardware interface;

identifying a portion of the software symbols that is passed through the hardware interface;

setting symbols in the symbolic simulation of the hardware-under-test to be connected to the portion of the software symbols.

13. The computer program product of claim 8, wherein said iteratively performing the concolic execution of the software-under-test and the symbolic simulation of the hardware-under-test comprises:

performing symbolic simulation of a single clock cycle of the hardware-under-test; and in response to conclusion of the symbolic simulation of the single clock cycle, utilizing results of the symbolic simulation of the single clock cycle in performing said concolic execution of the software-under-test.

14. The computer program product of claim 8, wherein said method further comprises:

in response to performing an iteration of said iteratively performing the concolic execution of the software-under-test and the symbolic simulation of the hardware-under-test, utilizing the symbolic co-simulation constraint to perform fuzzing of the test input, whereby obtaining a new test input, wherein the new test input is utilized in another iteration of said iteratively performing the concolic execution of the software-under-test and the symbolic simulation of the hardware-under-test.

15. An apparatus comprising said processor and a memory, wherein said memory retaining the computer program product of claim 8.

* * * * *